Patented July 28, 1953

2,647,091

UNITED STATES PATENT OFFICE 2,647,091

BATTERY BOXES

John M. McColgan, Los Angeles, Calif., assignor to Stauffer Chemical Company, a corporation of California No Drawing. Application January 26, 1953, Serial No. 333,360

4 Claims. (Cl. 260—17.2)

This in a continuation-in-part of application Serial No. 237,847, filed July 20, 1951.

This invention relates to improvements in dielectric substances and particularly to a composition which can be readily and simply formed into electrolyte containers such as battery jars, one-piece storage battery containers, and the like, to provide such an article at relatively low cost.

It has heretofore been proposed to form a dielectric substance from an asphalt, a mineral filler such as fuller's or diatomaceous earth, pyrophyllite and feldspar, preferably those of the amorphous type, and between 10% and 15% of organic fiber, e. g., cotton linters, kraft pulp, waste kraft paper, sulfite pulp, and the like and mixtures of these; a typical composition is disclosed in the Lukens Patent 1,752,917. When such a composition is prepared and is molded, one obtains an article which is generally satisfactory except that the dielectric strength of the article in use may not persist over as long a period of time as may be desired because the electrolyte wets the organic fiber, penetrates and proceeds lengthwise along the fiber, the latter acting, in effect, as a wick, thereby reducing the dielectric strength of the molded composition. In addition, the action of the acid electrolyte physically degrades the fiber and reduces the physical properties such as the tensile strength, impact resistance, and other properties of the composition.

A commonly employed test for acid absorption is one wherein a square of the substance, measuring two inches on each side, is cut from an intermediate portion of a partition wall in a one-piece storage battery container. The cut square, the edges being raw and unsealed, is then immersed at 150° F. in sulfuric acid of specific gravity 1.3 for twenty-eight days. Wetting of the organic fiber content of the composition by the electrolyte, in practical effect, reduces the effective or useful life of the substance so it is usual to coordinate the weight increase in the foregoing test with the desired life period of the substance. Thus, the usual compositions of the aforementioned Lukens patent will have an acid absorption value of the order of 3% and higher, under the above test, the actual value depending on the quality of the composition and the care employed in its preparation; if desired, a composition can be made in accordance with the present invention to have an acid absorption value of less than 0.1%. An acid absorption value of 1.5% under this test is presently considered highly satisfactory for commercial battery boxes with a permissible maximum of 1.8%.

The reduction of electrolyte absorption is one which the art has long attempted to solve. Various suggestions have been made as to how this might be achieved and such measures have included various procedures, practiced in an attempt to ensure a thorough and complete impregnation of the organic fiber with asphalt (Patent 1,886,269), while others have included the incorporation of various resins preformed substantially to the insoluble and infusible state (Patent 1,891,918), to provide an inner liner of a previously polymerized resin on the surface of the walls of the container, as by spraying a solution of the previously polymerized resin (Patent 2,119,278), and to include in the composition a resin which is in such a state of polymerization in the battery box that an acid barrier is formed only upon initial contact with the electrolyte (Patent 2,501,995).

In accordance with my invention, one incorporates in the organic fiber materials which penetrate into and fill more or less completely the voids in the fiber. The fiber is then subjected to such treatment that the void filling materials are rendered highly resistant to solution or action by the electrolyte or other components present; the treatment of the fiber is practiced prior to the molding operation although it may be and, in fact, preferably is a part of the procedure utilized for preparation of the components and the formation of these into the molding composition. The final material filling the fiber voids can be referred to as a resin in such an advanced state of infusibility and insolubility that the battery electrolyte has either no effect or a very reduced effect upon the fiber so that the composition has adequate acid resistance.

In one successful procedure practiced in accordance with this invention, resin-forming materials were reacted only sufficiently to form a low viscosity, water soluble resin; thereafter, a water solution of the partially condensed resin-forming materials was added to the organic fiber so that the fiber was wet with the solution and the solution soaked into the fiber and filled its voids; thereafter, the fiber was subjected to conditions under which further condensation occurred and the resin was rendered insoluble in the electrolyte. While I have mentioned that the resin-forming materials should be water soluble, this is employed only as an index of the degree of condensation which has occurred prior to application to the fiber with materials which are water soluble such as slightly condensed phenol-formaldehyde; the materials do not have to be in a solution of water although this is a cheap and convenient form of solvent; however, other solvents can be employed, preferably a polar solvent such as the various alcohols, but since these are usually relatively expensive as compared to water, they must usually be recovered; also, the use of a solvent other than water may present a fire or health hazard. Water solubility is one index of the degree of condensation that has been effected between the resin-forming materials, and if the polymers formed are of such character that they are readily water soluble, then they will have a relatively low molecular weight whereat the resin can diffuse into the organic fiber and occupy the lumen and other voids of the fiber; also, the aqueous A stage resin solutions tend to swell the fibers even more than water itself, which is of advantage, inasmuch as the organic fiber which has a resin formed in situ in the fiber voids while these are in a swollen or extended condition has little remaining capacity to absorb an electrolyte.

Incorporation of the resin-forming materials and the formation of the electrolyte resistant resins in situ in the fiber can be carried on as part of the preparatory manufacturing operation of the molding composition, or it can be carried on separately if desired and as a preliminary to actual preparation of the molding composition. However, the most convenient and economical practice at present is the former, and it is therefore presently preferred. Conversion of the water soluble fiber penetrating materials into electrolyte resistant resins generally includes heating of the impregnated fiber to a relatively elevated temperature and one whereat scorching or other harmful alteration of the fiber might occur. By utilizing a water solution of the fiber void filling material and by employing those substances which liberate water when they condense to a form in which they are resistant to the electrolyte, I am able to form the electrolyte-resistant resin in situ in the voids of the organic material without any harmful or deleterious effects upon the fiber. More or less total water may be used, depending upon variables of the equipment employed. Also, I wish to point out that I may employ resin-forming materials to form a partially polymerized A stage resin, which will be polar and of sufficiently low molecular weight for the purpose and yet in which little or no water will be present. A furfural-phenol resin is an example of the latter type. The water added to the composition as such and that liberated upon formation of the resin may amount to from 1% to 20% by weight of the composition, depending upon the type of mixing equipment employed.

As materials to be condensed in situ in the fibers to an electrolyte resistant resin, one can use any which is not harmful to the fibers and which impregnates these and which can then be condensed, preferably with release of water at a temperature or under conditions not harmful to the fiber, and to a state in which the product is not soluble in the electrolyte nor in the other components present. The degree of polymerization of the resin should be low; an indication of this in practice is a low viscosity of a high resin content solution. I have used solutions of resins containing 50% to 70% of resin solids and having a viscosity of less than 150 centipoises at 77° F. The preferred materials are those useful in the well-known phenol-aldehyde type of condensation and of which the condensation of phenol and formaldehyde is probably the best known example. As a partial replacement for phenol, one can use cresols, xylenols and other polyvalent phenols and aromatic hydroxy carboxy carboxylic acids. Various other aldehydes can be used including furfural; the invention is not limited to any particular condensation or polymerization materials except as has been indicated, that is, the material should have such a molecular weight that it penetrates the organic fiber and can thereafter be transformed into an insoluble substance, filling the voids in the cells without harm to the fiber. The viscosity of the resin is preferably less than 200 centipoises at 77° F. at 70% resin solids, the preferred value being between 100 and 160 centipoises. The above list of resins is not exhaustive and those skilled in the resin art will recognize others as useful in the practice of this invention. The term "resin," as used herein and in the claims, is used in the sense of a synthetic resinous substance in that stage of stability and infusibility whereat it is not acted upon by the sulfuric acid electrolyte in the battery. So far as the materials themselves are concerned, these are well-known to those skilled in the art and they will have no difficulty in selecting a suitable resin-forming material or mixture of resin-forming materials, such selection being dictated as much by cost, availability and other factors as by anything else. Those workers unskilled in the art can readily acquaint themselves with equivalent material for phenol and formaldehyde by reference to some standard work such as Ellis, The Chemistry of Synthetic Resins (Reinhold, 1935). Mixtures of two or more distinct resin-forming materials can also be employed.

It is important that the resin-forming materials should be polar at the time of application and that the polymerization at the time of application of the resin to the fiber should not have progressed sufficiently to form polymer molecules that are incapable of diffusion through the fiber wall and into the fiber.

Treatment with an appreciably polymerized resin or a non-polar resin results only in a coating upon the fiber; such treatment at best suffices to serve as a temporary barrier to the entry of electrolyte into the fiber, but is not capable of reducing the ability of the fiber to absorb electrolyte or to swell once contact with the electrolyte is made.

The same observations apply generally to the catalysts to be employed; I have used both acid and basic catalysts. The considerations governing the selection of any given catalyst are generally suitability of the catalyst to achieve the desired end result, namely, that the polymerization is substantially complete or nearly so, in the fiber after the molding of the final article.

In broad outline, the process includes mixing of the fiber with the resin-forming materials, the latter preferably being in a carrier which extends the resin-forming materials so they can be thoroughly dispersed throughout the usually voluminous organic fiber. To obtain maximum entry of the resin-forming materials into the organic fiber, the resin-forming materials are mixed thoroughly with the organic fiber before the filler and asphalt binder are added. The asphalt, the mineral filler and any supplemental materials are then added and the whole mass mixed thoroughly, following which it is put through a suitable heating and mixing device such as is provided by a Watson mixer and wherein it is mixed and heated for such time and at such a temperature that no harm comes to the fiber and yet the resins are in such a condition that the electrolyte has no effect upon the final molded composition.

In one operation embodying the present invention, after mixing in a Watson type mixer, the material was withdrawn in its heated condition and conveyed to a second mixer for additional mixing and heating, after which it was formed into a charge for molding in a suitable molding press wherein the plastic mass was formed into desired shape, being cooled in the course of the molding operation. The proportions of catalyst and resin are so adjusted and related to the temperature and time utilized in the heating and mixing as to complete substantially the condensation of the resin to an acid electrolyte resistant condition before the molding. Also, in some cases, it is desirable to use a suitable wetting agent to assist in obtaining even distribution of the resins through the mass of fibers; such agents are isopropyl naphthalene sodium sulfonate, morpholine oleate and 2-ethyl hexyl alcohol. At the temperatures usually employed in the preparation of the mix for molding and which are usually from 250° F. to 325° F., it is necessary for the mix containing the resins to be at the elevated temperature for from four to twenty minutes prior to molding, depending on the temperature, resin and catalyst. For any given manufacturing apparatus set-up, one can readily ascertain the correct time-temperature conditions with a few trial runs for the heat input in heaters and mixers is too empirical a matter to permit of precise definition. The resins are condensed to a stage whereat they are capable of protecting the fiber from attack by the electrolyte, yet are not hardened to a point whereat they are brittle and cause fiber breakage during the subsequent molding operation, that is, at the time of the molding operation the resins are passing through the stage whereat they are flexible while hot.

The practice of the invention will become further apparent upon consideration of the following examples which are set forth by way of example and not by way of limitation. The invention is not limited to any particular asphalt or bitumen, organic fiber or mineral filler, since these and the proportions to be employed are well-known in the art and one can refer to the aforementioned Lukens patent for an adequate disclosure of these. It can be stated that as the asphalt one can use any asphaltic substance having a penetration of around 25 at 150° F. in 5 seconds, under a weight of 100 grams (see the A. S. T. M. test method). It should not have a penetration as low as 5 under the same conditions. The mineral filler can be diatomaceous earth, fuller's earth, inert finely divided mineral clays and the like. The organic fiber can include cotton linters, kraft pulp, sulfite pulp, and mixtures of these (see Patent 2,514,019 for the use of such mixed fibers).

The quantity of resin-forming material added will vary with the degree of freedom from acid absorption desired. Usually, from 15% to 40% of the resin-forming materials on the basis of the dry weight of the fiber suffices to provide adequate fiber protection. The usual mix will contain from 45% to 55% of the asphalt, from 25% to 45% of the mineral filler, and from 10% to 20% of the organic fiber, all by weight, to make up 100%, as indicated in Table I. The foregoing values are those preferred and one can use different proportions, e. g., 35% to 65% of asphalt, 5% to 20% of organic fiber and the balance mineral filler.

|  | Preferred percent by weight |
|---|---|
| Mineral filler | 25 to 45 |
| Organic fiber | 20 to 10 |
| Asphalt | 55 to 45 |
|  | 100   100 |

In the above compositions, the resin will be present in an amount between 15% and 40% on the dry weight of the organic fiber present which is of such a nature that it is attacked by battery acid in the absence of the resin; the preferred resin quantity is about 35% on the dry weight of the organic fiber present which is of such a nature that it is attacked by battery acid in the absence of the resin; the preferred resin quantity is about 35% on the dry weight of the fiber. The quantity of organic fiber affects the tensile and impact properties of the molded composition and this fiber quantity can be increased above 20% and more resin utilized to protect it if this is warranted by the end use of the composition. In accordance with this invention, one can use a portion of a water insoluble resin providing it be only partially condensed and has a viscosity within the aforementioned values. Thus, one can use as much as 75% of the total resin content in the form of a low viscosity resin, but which is not water soluble. It is preferred to use 50% to 60% of the resin in the form of a low viscosity water insoluble resin because these are of lower cost than the water soluble resins.

The practice of the invention will become further apparent from the following examples which are set forth by way of illustration but not by way of limitation.

*Example 1.*—85 pounds of cotton was taken from a bale and suitably fluffed. It was then delivered to a mixer wherein 25 pounds of water solution of a very slightly condensed, water soluble phenol-formaldehyde resin and 25 pounds of a water insoluble cresol-xylenol-formaldehyde resin in a 70% solid content and having a viscosity of 160 centipoises at 77° F. were sprayed on the cotton. The water soluble resin was formed by the reaction of phenol and formaldehyde solution approximately in the ratios of 1 mol of phenol to 1.5 mols of formadehyde to a viscosity of approximately 80 to 150 centipoises at 77° F.; its solution contained 70% solids and included 2% by weight of a catalyst which was in turn made up of 50% of water, 25% sulfuric acid and 25% lactic acid. The cotton and resins were mixed in the mixer for two or three minutes to ensure that the cotton was uniformly wetted. 385 pounds of asphalt (penetration 26/50 gms./5 sec./185° F.) was then introduced together with 300 pounds of diatomaceous earth, and the whole mass mixed for four to five minutes; all the mixing up to this point was at atmospheric temperature. The mixture was then passed into a Watson mixer supplied with steam at 125 pounds gauge pressure wherein the mix was retained for three minutes. The mass issuing from the Watson mixer had a temperature of 250°; it was carried along a belt into a second Watson mixer from which it was extruded after ten minutes by a steam heated screw expeller in a continuous length at a temperature of 300°–325° F. It was thereafter cut off into suitable charges weighing 9 to 10 pounds each.

At this point, the resin had been condensed to a state whereat, when molded into a battery container, the resin was highly resistant to electrolyte attack. The average total time the mixture was at an elevated temperature before molding was of the order of eighteen minutes. The mass was then molded in a suitable press to form a battery container. One-piece storage battery containers formed of the foregoing composition when subjected to the previously mentioned acid absorption test, showed an absorption at the end of twenty-eight days of less than 1.5%. The other physical properties of the container were satisfactory and met the usual specifications in other respects.

*Example II.*—The same procedure and quantities were utilized as in Example I, except that the material was sprayed with 25 pounds of a water solution having a 60% solid content of the partially condensed phenol-formaldehyde mixture as the water soluble resin. The resulting one-piece battery container had an acid absorption value of less than 1.5%.

*Example III.*—The procedure of Example I was followed except that 1% by weight of isopropyl naphthalene sodium sulfonate wetting agent was included in the resin mixture and the total weight of resins was reduced to 40 pounds. This mixture was utilized together with cotton, asphalt and diatomaceous earth in the proportions specified; a container formed of the mixture had an acid absorption value of less than 1.5%.

*Example IV.*—The procedure of Example I was followed but 85 pounds of a waste kraft paper pulp were substituted for the cotton. The acid absorption value on a resulting one-piece battery container was less than 1.5%.

*Example V.*—50 pounds of furfuryl alcohol, 50 pounds of water and 0.1 pound of 85% phosphoric acid were heated under reflux to effect a partial condensation to a viscosity not exceeding 150 centipoises at 77° F. when the solution was neutralized with alkali. 20 pounds of the resulting solution, catalyzed with 2.5% of the catalyst specified in Example I, was employed as the water soluble resin in accordance with the procedure of Example I; the weight of the water insoluble resin was reduced to twenty pounds. The acid absorption test on a resulting one-piece battery container was less than 1.5%.

*Example VI.*—The procedure of Example I was followed, but 25 pounds of a phenol-furfural resin were used instead of the phenol-formaldehyde resin. The resulting container had an acid absorption value of less than 1.5%.

*Example VII.*—The same procedure and resin were employed as in Example I, except that 21 pounds of the water soluble resin was used with 0.5% of sodium hydroxide as catalyst, and 2 pounds of commercial ammonium hydroxide solution and the weight of the water insoluble resin was reduced to 21 pounds. The acid absorption test on a resulting one-piece battery container was 1.5%.

*Example VIII.*—The procedure of Example I was followed but instead of the resins used therein, 25 pounds each of a water-soluble resin from the group of phenol-formaldehyde, phenol-furfural and furfuryl alcohol resin, each having a viscosity between 80 and 150, were used in each composition along with 25 pounds each of a water insoluble resin from the group of phenol-formaldehyde, phenolfurfural, furfuryl alcohol, cresol formaldehyde and xylenol formaldehyde resin, each having a viscosity above 150 but less than 200 centipoises. Eighteen containers were made up from these compositions. When tested, each had an acid resistance of less than 1.7%.

From the foregoing, it should be apparent that a novel process has been provided for improving the dielectric strength and other properties of molded compositions, as well as improved composition.

I claim:

1. A process for increasing the resistance to acid attack and penetration of a molded article of a composition including asphalt as a binder, filler material including acid-resistant mineral matter and substantially 10% to 15% by weight of the composition of organic fiber of acid attackable nature, which comprises first spraying the organic fiber with a mixture of water and of from substantially 15% to 40% by weight of the organic fiber present of resin-forming material selected from a first class consisting of polymerized furfuryl alcohol, phenol furfural and phenol formaldehyde, and a second class consisting of cresol-formaldehyde and xylenol-formaldehyde, the second class providing approximately 50% to 75% of the total resin-forming material, said resin-forming material being pre-polymerized to a viscosity of approximately 80 to 200 centipoises at 77° F. and including a catalyst for polymerization of said material into a resin which is highly resistant to storage battery acid at normal temperature of storage battery use whereby acid penetration in said article will be resisted by reason of the formation in situ in the organic fiber of an acid barrier therein due to the catalyzing action of the catalyst on the resin-forming material, mixing the sprayed fiber to wet the same uniformly, adding the binder and the mineral filler to the impregnated organic fiber to complete the composition, then heating the so-formed composition to a temperature and for a time sufficient to complete substantially polymerization of the resin-forming material into a resin which is substantially impervious to attack by storage battery acid at a temperature of normal use of a storage battery, and then molding an article from the composition.

2. A process for increasing the resistance to acid attack and penetration of a molded article of a composition including asphalt as a binder, filler material including acid-resistant mineral matter and substantially 10% to 15% by weight of the composition of organic fiber of acid attackable nature, which comprises first spraying the organic fiber with a mixture of water and of from substantially 15% to 40% by weight of the organic fiber present of resin-forming material selected from a first class consisting of polymerized furfuryl alcohol, phenol furfural and phenol-formaldehyde and a second class consisting of cresol-formaldehyde and xylenol-formaldehyde, the second class providing approximately 40% to 75% of the resin-forming material, said resin-forming material being pre-polymerized to a viscosity of approximately 80 to 200 centipoises at 77° F. and including a catalyst for polymerization of said material into a resin which is highly resistant to storage battery acid at normal temperature of storage battery use whereby acid penetration in said article will be resisted by reason of the formation in situ in the organic fiber of an acid barrier therein due to the catalyzing action of the catalyst on the resin-forming material, mixing the sprayed fiber to wet the same uniformly, and then adding the binder and the mineral filler to the impregnated organic fiber to complete the composition, then heating the so-formed composition to a temperature between 250° F. and 325° F. for a time sufficient to complete substantially polymerization of the resin-forming material into a resin which is substantially impervious to attack by storage battery acid at a temperature of normal use of a storage battery, and then molding an article from the composition.

3. A process for increasing the resistance to acid attack and penetration of a molded article of a composition including asphalt as a binder, filler material including acid-resistant mineral matter and substantially 10% to 15% by weight of the composition of organic fiber of acid attackable nature, which comprises first spraying the organic fiber with a mixture of water and of from substantially 15% to 40% by weight of the organic fiber present of resin-forming material consisting of phenol formaldehyde and cresol-formaldehyde, the cresol-formaldehyde providing approximately 40% to 75% of the total resin-forming material, said resin-forming material being pre-polymerized to a viscosity of approximately 80 to 200 centipoises at 77° F. and including a catalyst for polymerization of said material into a resin which is highly resistant to storage battery acid at normal temperature of storage battery use whereby acid penetration in said article will be resisted by reason of the formation in situ in the organic fiber of an acid barrier therein due to the catalyzing action of the catalyst on the resin-forming material, mixing the sprayed fiber to wet the same uniformly, adding the binder and the mineral filler to the impregnated organic fiber to complete the composition, then heating the so-formed composition to a temperature and for a time sufficient to complete substantially polymerization of the resin-forming material into a resin which is substantially impervious to attack by storage battery acid at a temperature of normal use of a storage battery, and then molding an article from the composition.

4. A process for increasing the resistance to acid attack and penetration of a molded article of a composition including asphalt as a binder, filler material including acid-resistant mineral matter and substantially 10% to 15% by weight of the composition of organic fiber of acid attackable nature, which comprises first spraying the organic fiber with a mixture of water and of from substantially 15% to 40% by weight of the organic fiber present of resin-forming material consisting of phenol formaldehyde and xylenol formaldehyde, the xylenol formaldehyde providing approximately 50% to 75% of the total resin-forming material, said resin-forming material being pre-polymerized to a viscosity of approximately 80 to 200 centipoises at 77° F. and including a catalyst for polymerization of said material into a resin which is highly resistant to storage battery acid at normal temperature of storage battery use whereby acid penetration in said article will be resisted by reason of the formation in situ in the organic fiber of an acid barrier therein due to the catalyzing action of the catalyst on the resin-forming material, mixing the sprayed fiber to wet the same uniformly, adding the binder and the mineral filler to the impregnated organic fiber to complete the composition, then heating the so-formed composition to a temperature and for a time sufficient to complete substantially polymerization of the resin-forming material into a resin which is substantially impervious to attack by storage battery acid at a temperature of normal use of a storage battery, and then molding an article from the composition.

JOHN M. McCOLGAN.

No references cited.